UNITED STATES PATENT OFFICE.

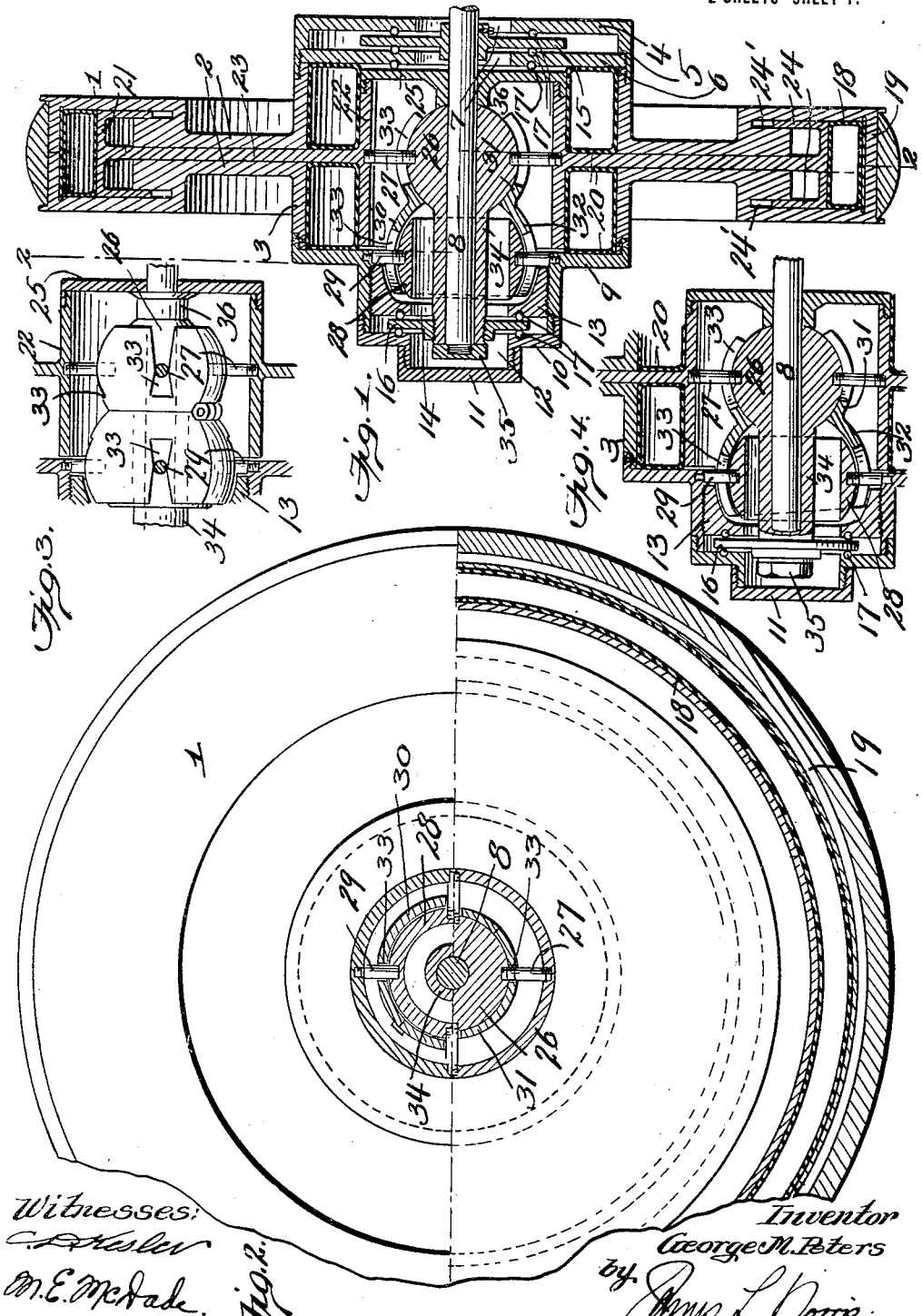

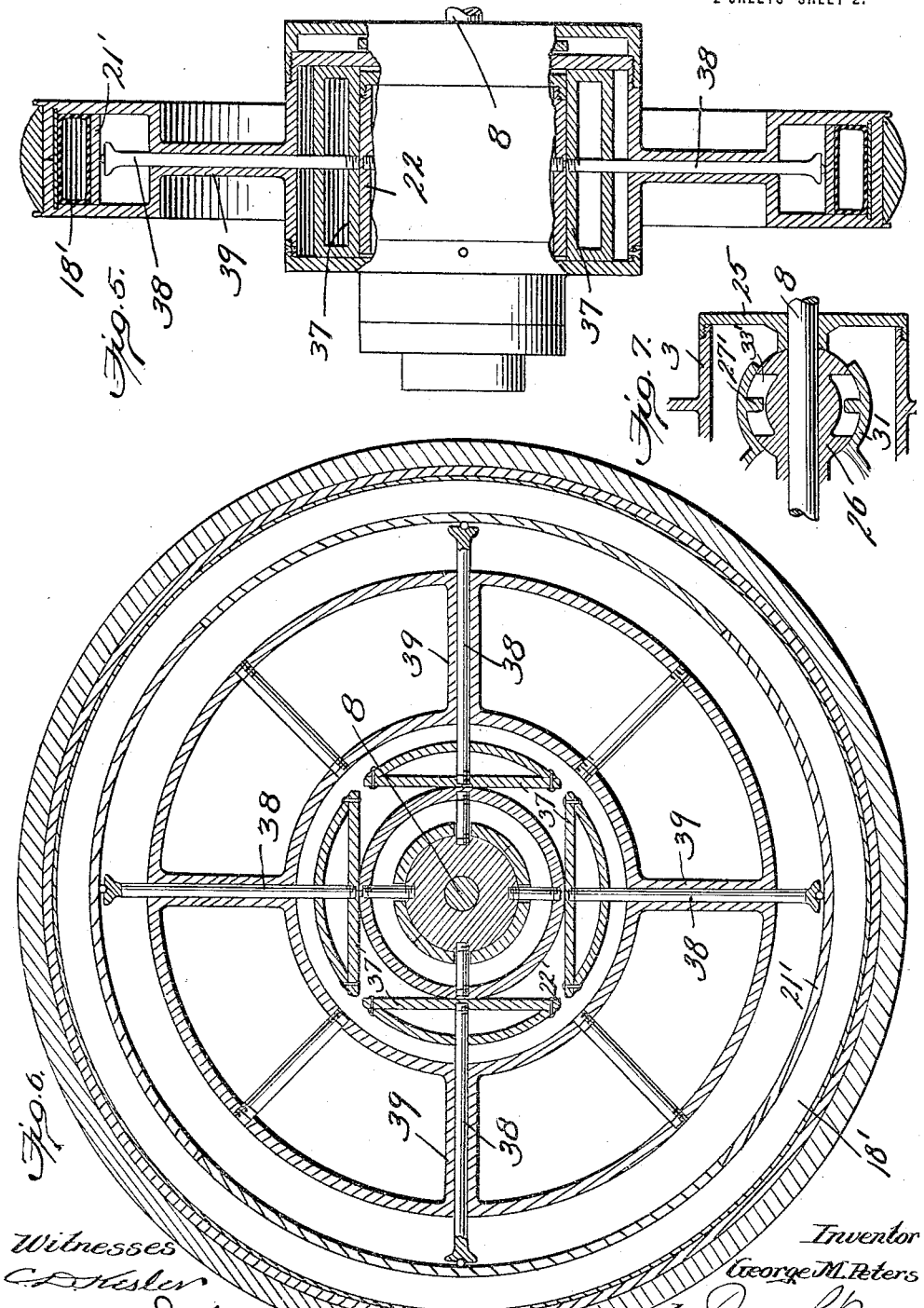

GEORGE MARQUES PETERS, OF KIRKWOOD, MISSOURI.

CUSHION-WHEEL.

1,198,952.

Specification of Letters Patent.

Patented Sept. 19, 1916.

Application filed January 6, 1916. Serial No. 70,660.

*To all whom it may concern:*

Be it known that I, GEORGE M. PETERS, a citizen of the United States, residing at Kirkwood, in the county of St. Louis and State of Missouri, have invented new and useful Improvements in Cushion-Wheels, of which the following is a specification.

This invention relates to improvements in cushion wheels for vehicles, proposing a construction wherein cushioning media are operatively interposed between the felly and the axle and wherein the wheel is specially adapted for motor vehicles by the provision of universal driving connections between the axle and the wheel proper.

The objects of the invention, briefly stated, are to provide a wheel of the type identified which has highly efficient shock absorbing properties, wherein the parts are readily accessible for renewal, cleaning or repair, and which embodies an exceedingly simple, strong and compact organization for directly driving the wheel from the axle regardless of the constant relative radial play of the axle and the felly.

Embodiments of the invention are illustrated in the accompanying drawings, wherein:—

Figure 1 is a cross-sectional view of one form of a wheel in which the features of the invention are incorporated; Fig. 2 is a view, partly in side elevation and partly in longitudinal section, on the line 2—2 of Fig. 1; Fig. 3 is a detail view showing the universal driving connections between the axle and the felly; Fig. 4 is a detail sectional view in the same plane as Fig. 1, but showing the axle in an upwardly displaced position relatively to the hub of a wheel and showing the manner in which the universal driving connection acts to compensate for the radial shifting of the axle; Fig. 5 is a sectional view similar to Fig. 1 but showing a slightly modified construction; Fig. 6 is a central longitudinal sectional view of the modified construction shown in Fig. 5; and Fig. 7 is a sectional view showing a modification in the construction of the universal driving connections between the axle and the wheel proper.

Similar characters of reference designate corresponding parts throughout the several views.

In Fig. 1 the wheel proper includes a felly 1 formed with a pair of spaced disks 2 which take the place of the usual spokes and have at their centers annular laterally projecting flanges 3 which constitute the hub. The flange 3 at the outer side of the wheel is threaded to enable the attachment thereto of an inner hub cap 4 having an internal annular shoulder 5 between which and the end of the adjacent flange 3 a bearing plate 6 is confined. The hub cap 4 and the plate 6 are formed with central openings 7 whose diameters are two or three times greater than the diameter of the axle 8, the end portion of which projects through said openings and through the hub. The hub member 3 at the outer side of the wheel is threaded to enable the attachment of an annular angle piece 9 and the hub cap at the outer side of the wheel consists of two members 10 and 11, the member 10 being threaded on the angle piece 9 and having a central opening 12 and the member 11 closing the opening 12 in the member 10. The angle piece 9 carries an internally arranged bearing plate 13 which confronts the member 10 of the outer hub cap and has a central opening 14 alining with the opening 12. The openings 12 and 14 are of approximately the same diameter as the openings 7 and are provided to receive the end of the axle 8.

The axle is shiftable radially of the wheel and is guided in its shifting movements by plates 15 and 16, the former projecting into the space between the hub cap 4 and the plate 6 and the latter projecting into the space between the hub cap member 10 and the plate 13. The hub cap 4 and the plate 6, and in like manner, the member 10 and the plate 13, are preferably provided with race-ways for bearing balls 17 by which the friction incident to the radial movements of the plates 15 and 16 is minimized.

The axle 8 in its radial shifting movements coöperates with suitable shock absorbing means. According to Fig. 1, shock absorbing media are arranged within the felly 1 and within the hub and consist, in the case of the felly, of an annular pneumatic cushion 18 bearing against the rim 19, and in the case of the hub, of a pair of similar cushions 20 bearing against the hub members 3. The axle 1 coöperates with the said cushions through the agency of thrust rings 21 and 22 which are connected by an annular plate 23 slidably interposed between the plates 2. The ring 21 is preferably provided at its sides with inwardly projecting guide flanges 24 which work in guide grooves 24' formed within the felly 1. The rings 21 and 22 participate, as a unit, in the radial shifting movements of the axle 8 and for this purpose the ring 22 carries a plate 25 which has a close fit upon the axle 8 and adjoins the bearing plate 6. The plate 25 may be rigidly secured to the ring 22 in any suitable manner. If desired, bearing balls 17' may be interposed between the plates 25 and 6. The axle 8 carries within the hub a ball member 26 which has a close fit thereon and is movable radially therewith. The ring 22 may also be connected by radially disposed pins 27 to the ball member 26, in which case, the pins 27 fix the ball member 26 against longitudinal displacement on the axle, additionally brace the ring 22 to the axle, and may also be used to co-act with other elements of the driving connections between the axle and the wheel proper.

The driving connections between the axle and the wheel proper provide a universal joint and include the ball member 26 above referred to, a second ball member 28 which is rigid with the wheel, and, as shown, is connected by pins 29 to the angle piece 9, and a coupling member 30 extending between said ball members and having a part 31 conformably fitting over the ball member 26 and a part 32 conformably fitting over the ball member 28. The parts 31 and 32 are provided with slots 33 through which the pins 27 and 29 project, these slots being preferably of hour-glass shape, as shown in Fig. 3. The part 32 has a slightly greater internal diameter than the external diameter of the ball member 28 in order to compensate for the slight lengthening of the distance between the radial centers of the ball members 28 and 26 as the latter moves radially away from the radial center of the hub.

By preference, there are four pins 27 and four pins 29 which are equidistantly arranged about the peripheries of the ball members 26 and 28 and which provide for radial shifting movements of the axle 8 in any direction while at the same time positively transmitting the rotation of the axle to the wheel proper.

The arrangement of the pins 27, as shown in Fig. 1, is preferred, but in lieu of this arrangement, the coupling part 31 can be provided with inwardly projecting pins 27' engaging slots 33' in the ball member 26, as shown in detail in Fig. 7.

It is preferred to provide the ball member 26 with an axial extension 34 which projects to the end of the axle and is engaged by a retaining nut 35 which serves to prevent any endwise movement of the ball member 26 on the shaft 8 and confine said ball member against a thrust collar 36 provided on the plate 25. The plate 16 is preferably mounted on the extension 34 of the ball member 26.

In the construction shown in Figs. 5 and 6, the universal driving connections, as explained in connection with Fig. 1, are employed without change. The modification consists, however, in the adaptation of the shock absorbing elements of the construction to a wheel having spokes. In this case, the annular cushions 20, shown in Fig. 1, are not employed and the thrust ring 22 bears against shoes 37 which are radially displaceable in the annular space between said thrust ring and the hub members 3. The felly is hollow, as in the embodiment of Fig. 1, and incloses an annular cushion 18' similar to the cushion 18 of Fig. 1. The office of the thrust ring 21 shown in Fig. 1 is fulfilled by thrust segments 21', each of which is acted upon by a radially disposed and radially movable rod 38. Certain of the spokes 39 are tubular and the rods 38 project through these tubular spokes, each rod carrying at its inner end one of the shoes 37 aforesaid. The shoes 37, of which four are employed in the embodiment shown, have flat faces adjacent the ring 22. It will be apparent that as the axle shifts from the radial center of the wheel, the ring 22 will effect a displacement of one of the shoes 37 or of two angularly adjoining shoes 37, according as the axle is shifted in a direction coincident with the direction in which one of the rods 38 extends or at an angle to the directions in which the rods 38 extend.

Having fully described my invention, I claim:—

1. In combination, a wheel having a hollow hub, an axle projecting into said hub and displaceable from and toward the radial center thereof, thrust means radially slidable in the hub, cushioning means co-acting with the thrust means, a ball member mounted on the axle within the hub, a second ball member within the hub and fixed thereto, a connection between the axle and the thrust means whereby the latter is radially displaceable with the axle, a coupling member having globular parts fitting over and conforming to the respective ball members and forming companions thereof, driving pins operatively connecting the first ball member and its companion globular part and the other globular part and the hub, one of each pair of companion parts having longitudinal slots for the driving pins and the latter being arranged to permit universal movement of the coupling member relatively to the ball members and bearing plates movable with the axle and closing the ends of the hub through which the axle projects.

2. In combination, a wheel having a hollow hub, an axle projecting into said hub and displaceable from and toward the radial center thereof, bearing plates movable with the axle and adjoining the ends of the hub, a thrust ring mounted for radial sliding movement within the hub intermediate the bearing plates and connected to the axle for radial displacement therewith, cushioning means co-acting with the thrust ring and universal joint driving connections between the axle and the hub, said connections having a ball member thereof mounted on the axle and arranged within said thrust ring.

3. In combination, a wheel having a hollow hub, an axle projecting into said hub and displaceable from and toward the radial center thereof, bearing plates movable with the axle and adjoining the ends of the hub, a thrust ring mounted for radial sliding movement within the hub intermediate the bearing plates and connected to the axle for radial displacement therewith, cushioning means co-acting with the thrust ring, and driving connections between the axle and the hub arranged intermediate said bearing plates and comprising a ball member radially displaceable with the axle, a second ball member fixed relatively to the hub, a coupling having globular parts conformably engaging over and universally movable relatively to said ball members and pins operatively connecting the radially displaceable ball member and its companion globular part and the other globular part and the wheel.

In testimony whereof I have hereunto set my hand in presence of two subscribing witnesses.

GEORGE MARQUES PETERS.

Witnesses:
J. J. ROWE,
RANSOM L. ARNOLD.

Copies of this patent may be obtained for five cents each, by addressing the "Commissioner of Patents, Washington, D. C."